United States Patent [19]
Sadler

[11] Patent Number: 5,881,937
[45] Date of Patent: Mar. 16, 1999

[54] MOVABLE FRAME ASSEMBLY

[76] Inventor: William R. Sadler, 1520 Edgewood Dr., Altoona, Wis. 54720

[21] Appl. No.: 949,667

[22] Filed: Oct. 14, 1997

[51] Int. Cl.⁶ .................................................... B60R 09/06
[52] U.S. Cl. .......................... 224/509; 224/510; 224/521; 224/527; 224/529
[58] Field of Search .................................... 224/521, 510, 224/509, 502, 524, 526, 527, 529

[56] References Cited

U.S. PATENT DOCUMENTS

| | | |
|---|---|---|
| 3,163,339 | 12/1964 | Merchant . |
| 3,251,520 | 5/1966 | Van Dyke et al. .................. 224/521 X |
| 4,369,902 | 1/1983 | Lampeas . |
| 4,593,840 | 6/1986 | Chown ................................. 224/510 X |
| 4,671,439 | 6/1987 | Groeneweg . |
| 4,744,590 | 5/1988 | Chesney . |
| 5,018,651 | 5/1991 | Hull et al. ................................ 224/521 |
| 5,029,740 | 7/1991 | Cox . |
| 5,038,983 | 8/1991 | Tomososki . |
| 5,224,636 | 7/1993 | Bounds . |
| 5,232,135 | 8/1993 | Marren . |
| 5,310,100 | 5/1994 | Liscinsky . |
| 5,360,150 | 11/1994 | Praz . |
| 5,439,151 | 8/1995 | Clayton ............................... 224/529 X |
| 5,458,389 | 10/1995 | Young ................................. 224/510 X |
| 5,544,799 | 8/1996 | Didlake ................................... 224/502 |
| 5,586,702 | 12/1996 | Sadler . |
| 5,752,639 | 5/1998 | Rice ......................................... 224/521 |

OTHER PUBLICATIONS

Outdoor Innovations/ American Media Group; Internet Website excerpt; information about Aeropack™ Cargo Carrier; Oct. 22, 1998; http://www.aeropack1.com.

*Primary Examiner*—David J. Walczak
*Assistant Examiner*—Kathleen J. Prunner
*Attorney, Agent, or Firm*—Skinner and Associates

[57] ABSTRACT

A vehicle cargo carrier, and specifically a movable frame assembly, for storing and transporting luggage, gear, equipment and the like on the exterior of a vehicle. The carrier is attached to a common trailer hitch and is particularly well suited for use with a mini-van or sport utility vehicle which has a rear opening door or hatch. The carrier is slidably movable, permitting outward extension, while still being connected to the vehicle, to provide easy access to and unobstructed opening of the vehicle rear door or hatch, and to provide unobstructed access to the vehicle's existing interior cargo area. Subsequently, the carrier is inwardly slidably retracted so that it is firmly disposed in an aerodynamically favorable position proximate the rear of the vehicle. The frame assembly comprises a connection member which interfaces with the hitch and a frame member which interfaces with the connection member. A storage box or container member is connected to the frame member.

30 Claims, 10 Drawing Sheets

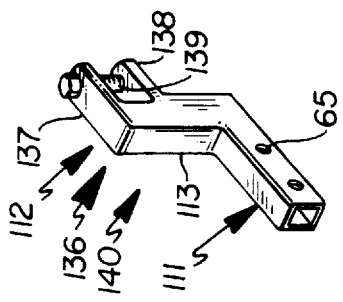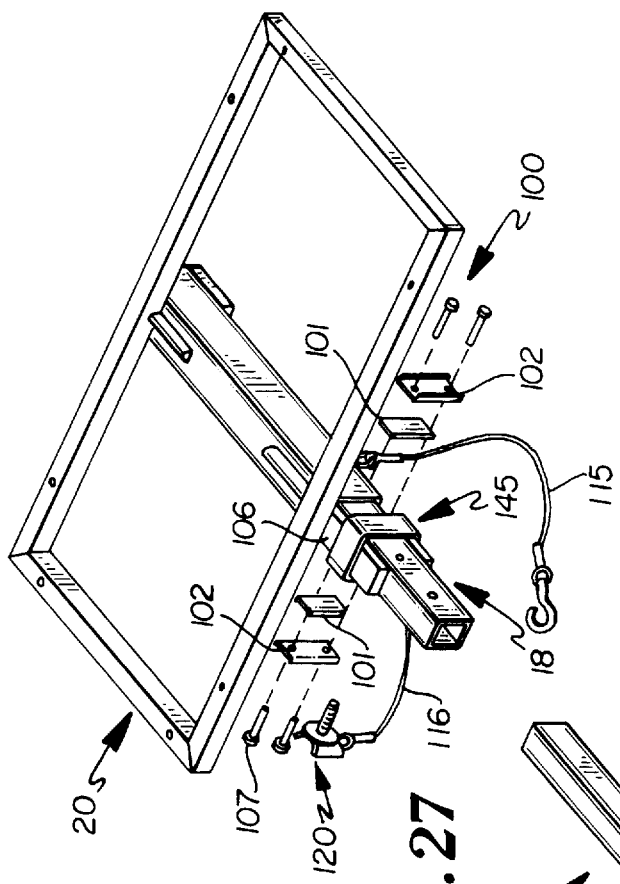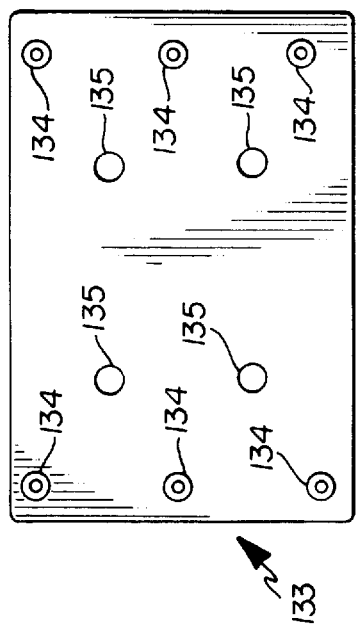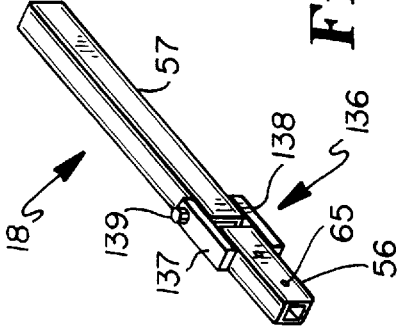

MOVABLE FRAME ASSEMBLY

BACKGROUND OF THE INVENTION

1. Field of the Invention

This invention relates to vehicular storage apparatus, and more particularly to a movable frame assembly for a cargo or equipment carrier attached to the exterior of a vehicle. The frame assembly of this invention is particularly useful with mini-vans or sport utility vehicles when attached to a standard tow or trailer hitch or attachment thereon.

2. Background Information

In the past, various devices have been used and/or proposed to carry equipment such as luggage on the exterior of a vehicle. However, these devices have significant limitations and shortcomings. They tend to obstruct the opening and closing of a rear door of a vehicle, and tend to allow excessive lateral play or twisting by the frame assembly within the hitch. Additionally, any extendable members in these devices tend to bind whenever the carrier is unevenly loaded. Furthermore, these devices are unable to quickly and easily adjust the mounting position of a cargo carrier to make it level with respect to the vehicle.

U.S. Pat. No. 5,038,983 to Tomososki and U.S. Pat. No. 5,310,100 to Liscinsky disclose a vehicle cargo carrier attachment which is connectable to a common trailer hitch. The carrier includes a fixed bracket supporting a cargo box. U.S. Pat. No. 4,671,439 to Groeneweg discloses a luggage carrier apparatus for a vehicle. A mounting apparatus telescopingly connects the carrier to a mini-van frame. U.S. Pat. No. 5,586,702 to Applicant discloses a movable vehicle cargo carrier.

Despite the need in the art for a cargo carrier, and specifically a movable or adjustable frame assembly, which overcomes the disadvantages, shortcomings and limitations of the prior art, none insofar as is known has been developed or proposed.

Accordingly, it is an object of the present invention to provide an improved cargo carrier for vehicles. It is a further object of this invention to provide a cargo carrier which is attachable via a common vehicle hitch system, which is easily attachable and detachable, which is easily accessible, which permits easy access to and operation of the rear door or hatch of the vehicle (and the interior vehicle cargo area), which has an aerodynamically favorable design and is conveyed in an aerodynamically favorable position with respect to the vehicle with which it is conveyed, and which overcomes the limitations and shortcomings of the prior art.

BRIEF SUMMARY OF THE INVENTION

The apparatus of the present invention provides a vehicle cargo carrier for storing and transporting luggage, gear, equipment and the like on the exterior of a vehicle.

In a basic aspect, the invention provides a movable frame for attachment to the rear portion of a vehicle via a trailer hitch, comprising:

(a) a connection member for attachment to the vehicle trailer hitch, the connection member having a predetermined configuration; and (b) a frame member slidably attached to the connection member.

In a preferred embodiment, the invention provides a cargo carrier for attachment to the rear portion of a vehicle via a receiver-type trailer hitch having a rectilinear tubular configuration with an open central channel, comprising:

(a) a connection member for attachment to the vehicle trailer hitch, the connection member having a straight bar structure of a predetermined length and having a proximal end for insertion into the vehicle trailer hitch channel and an opposing distal end, the bar structure having predetermined outside dimensions which are substantially equivalent to inside dimensions of the trailer hitch channel;

(b) a frame member slidably attached to the connection member, the frame member including a receiving member which is telescopingly slidably connected to the connection member and a box support member attached to the receiving member, the receiving member having a straight bar structure of a predetermined length and having a proximal end for sliding insertion over the connection member and an opposing distal end, the bar structure having predetermined inside dimensions which are substantially equivalent to outside dimensions of the connection member; and (c) a box member attached to the box support member, the box member having predetermined dimensions and including a body and a rear opening top lid pivotally attached thereto.

The connection member may have a variety of extendable, pivotal, or raised designs; and the frame member may have a tilting adjustment mechanism for leveling the cargo carrier. Furthermore, a connection member clamp and safety pin assembly can be used to reduce lateral play in the frame assembly and a sandwich member can be used to prevent binding in the extendable members of the frame assembly.

The features, benefits and objects of this invention will become clear to those skilled in the art by reference to the following description, claims and drawings.

BRIEF DESCRIPTION OF THE SEVERAL VIEWS OF THE DRAWING

FIG. 25 is a planar view of an exhaust shield.

FIG. 26 is a perspective view of a raised pivotal connection member.

FIG. 27 is a perspective view of a retracted and locked pivotal frame apparatus.

FIG. 28 is a perspective view of the pivotal connection member shown in FIG. 27.

DETAILED DESCRIPTION

The vehicle cargo carrier 10 of the present invention is useful for storing and transporting luggage, gear, equipment and the like on the exterior of a vehicle, thus conserving interior vehicle space increasing useful vehicle storage capability and enabling improved interior cleanliness. The carrier 10 is attached to a common receiver-style trailer hitch and is particularly well suited for use with a mini-van or sport utility vehicle which has a rear door or hatch. Such vehicles pose problems for prior art carriers because the rear doors or hatches open outwardly and are blocked by such carriers. The carrier 10 is equally well suited for use with automobiles (to provide access to the trunk) of a variety of makes and models so long as they are equipped with a hitch. The carrier 10 of the present invention is movable, permitting outward extension and an optional pivoting motion while connected to the vehicle, to provide unobstructed opening of the vehicle rear door or hatch to access the interior vehicle cargo area. Subsequently, the carrier 10 may be inwardly retracted so that it is firmly disposed in an aerodynamically favorable position closely spaced to but not contacting the rear of the vehicle. The carrier 10 also preferably has an aerodynamically favorable configuration which minimizes drag and conserves power and fuel usage.

Figure 1:
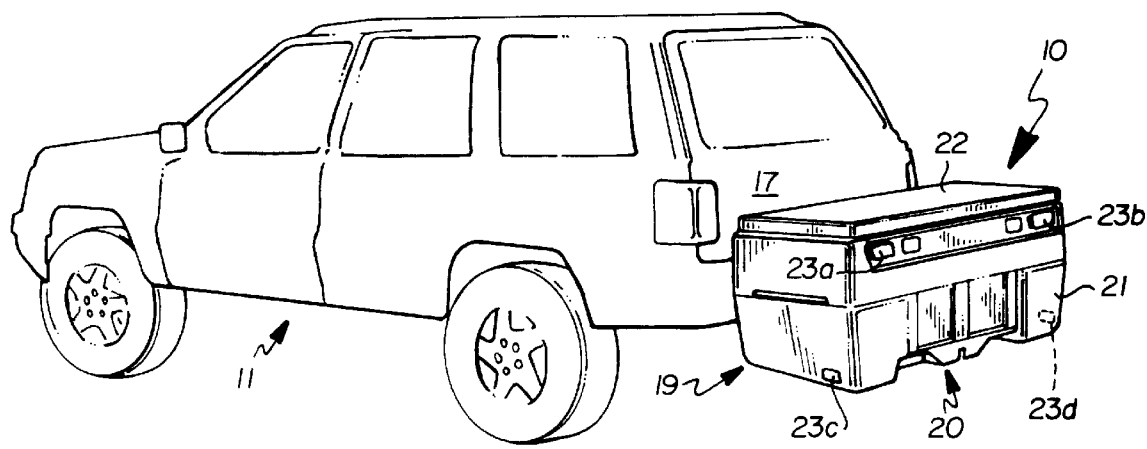
FIG. 1 is a perspective view of the vehicle cargo carrier apparatus operatively attached to a vehicle.
Figure 2:
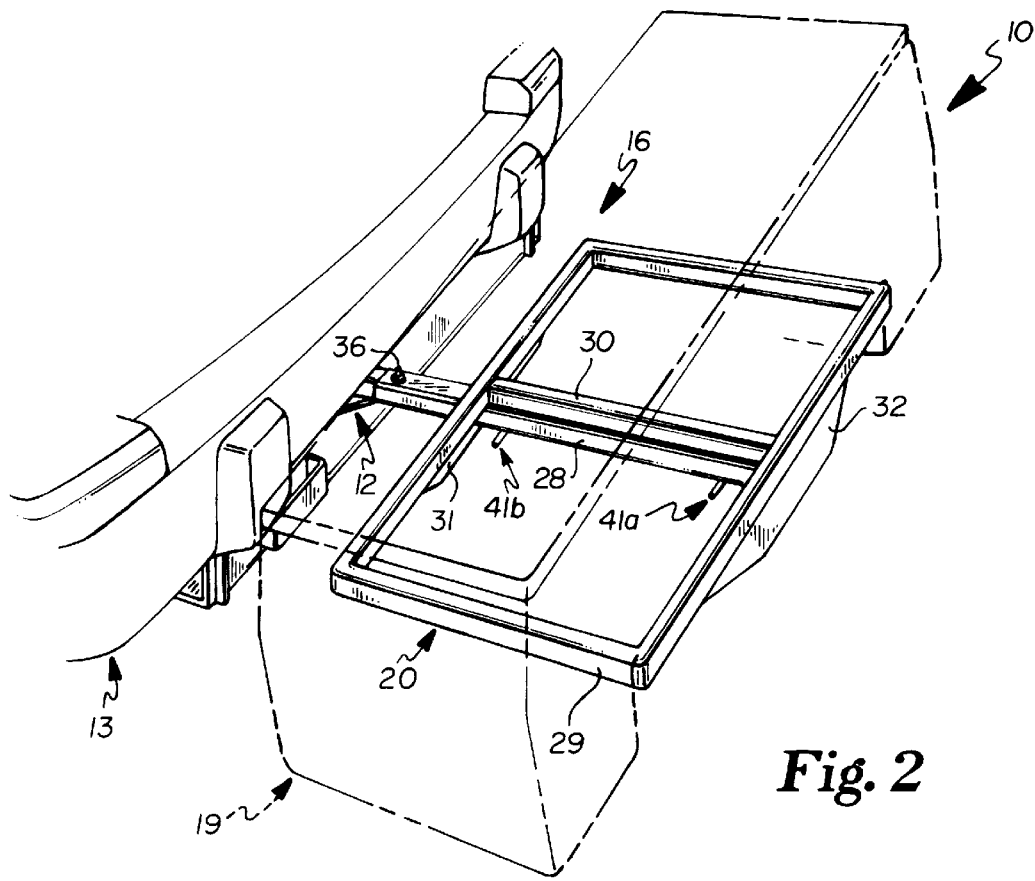
FIG. 2 is a perspective view of the frame assembly of the cargo carrier apparatus, shown in a retracted position.
Figure 7:
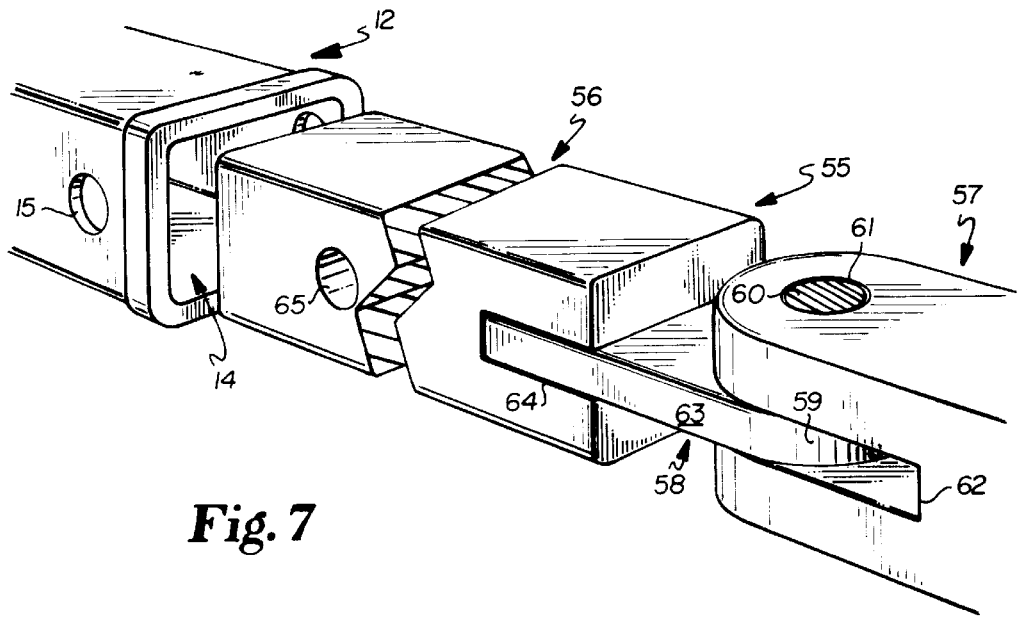
FIG. 7 is a perspective view of an embodiment of a connection member.
Figure 8:
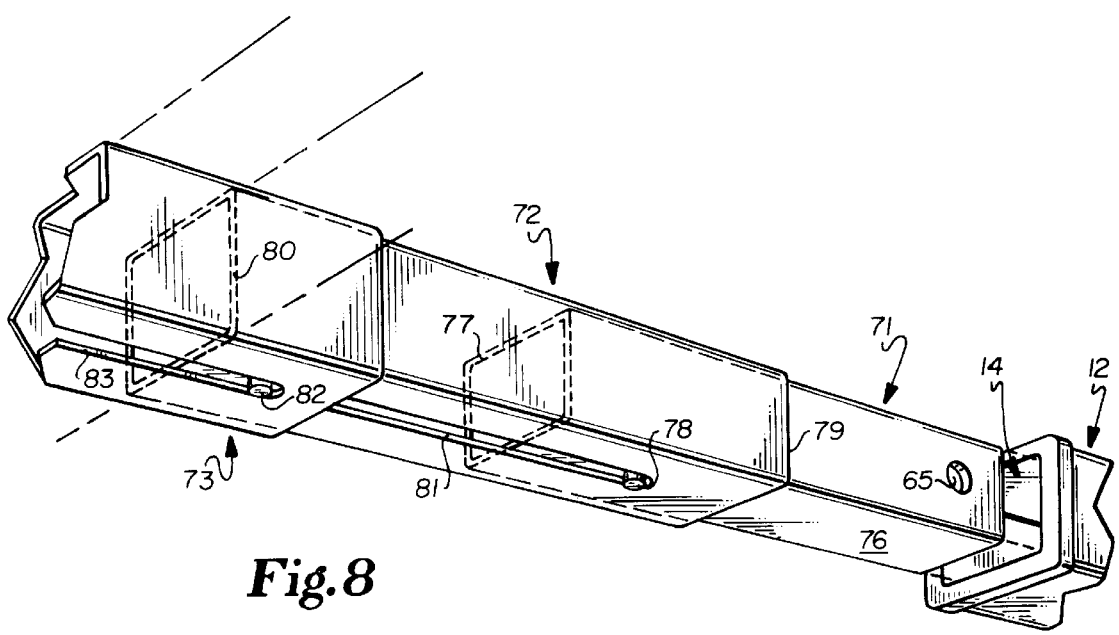
FIG. 8 is a perspective view of another embodiment of a connection member.
Figure 9:
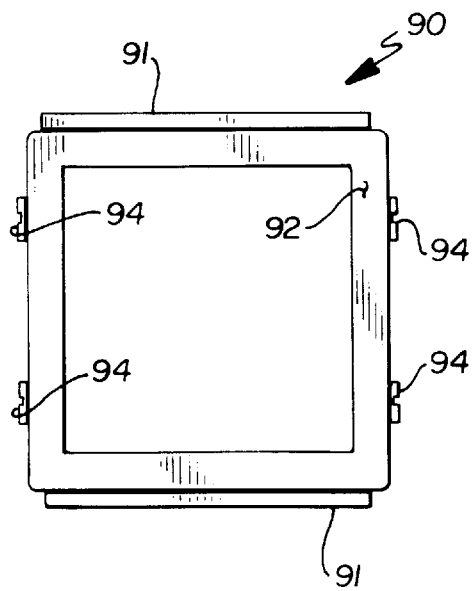
FIG. 9 is a rear view of a connection member clamp.
Figure 10:
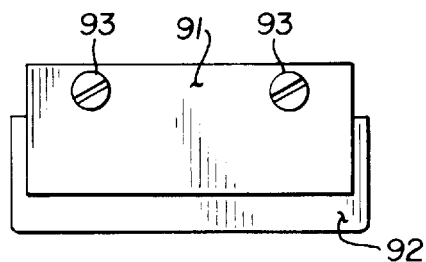
FIG. 10 is a top view of the clamp of FIG. 9.
Figure 11:
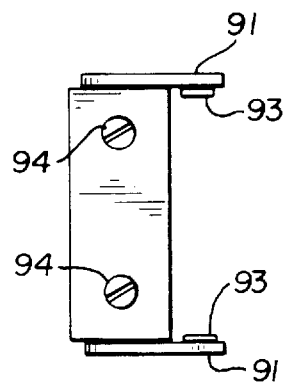
FIG. 11 is a side view of the clamp of FIG. 9.
Figure 14:
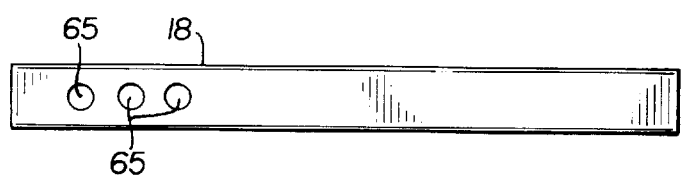
FIG. 14 is a side view of an embodiment of the connection member.
Figure 15:
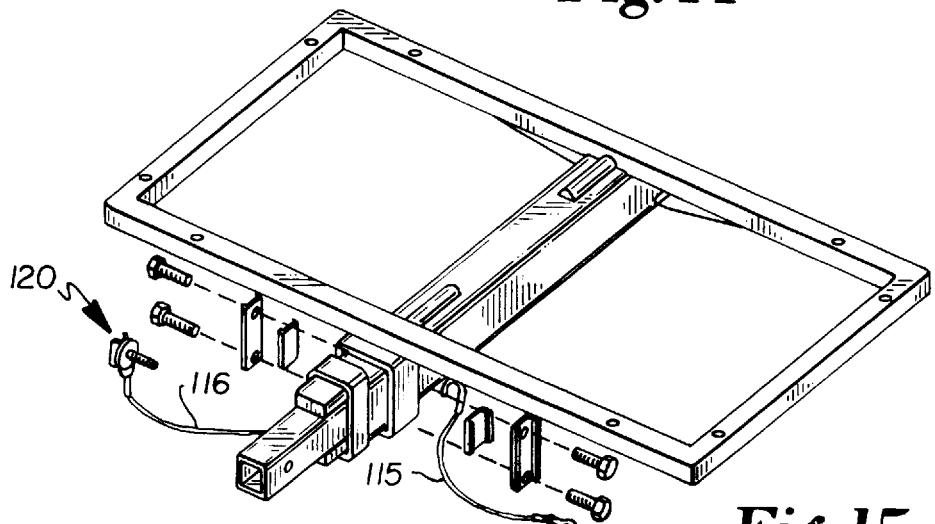
FIG. 15 is a perspective view of an embodiment of the frame assembly.

Referring to FIGS. 1 and 2, the carrier 10 is connected to the rear end of a vehicle 11, for example a sport utility vehicle having a outwardly opening hatch 17. Referring also to FIGS. 7 and 8, the carrier 10 is connected to the vehicle via a well known and commonly used receiver-style trailer hitch 12 of the type having a substantially square tubular member with an open central space or channel 14, which also has a substantially square configuration. In the instant example, the hitch 12 is disposed centrally with respect to the rear of the vehicle 11, under the rear bumper 13. Typically, such hitches 12 have at least one connection aperture 15 aligned with an aperture 65 in the connection member 18 through which a connection pin (not shown) is disposed for locking a trailer or other member to the hitch 12. Referring to FIG. 14, the connection member 18 preferably has multiple apertures 65 to accommodate different vehicle hitch locations with respect to the bumper.

The carrier generally comprises a movable frame assembly 16 and a box or container member 19. Referring to FIGS. 1–4, the frame assembly 16 essentially comprises a connection member 18 which interfaces with the hitch 12 and a frame member 20 which interfaces with the connection member 18. The box member 19 is connected or mounted to the frame member 20. The box member 19 preferably has one or more rear safety lights 23a, b, c and d communicatively connected to the electrical system of the vehicle 11 via a wiring harness 25.

Figure 3:
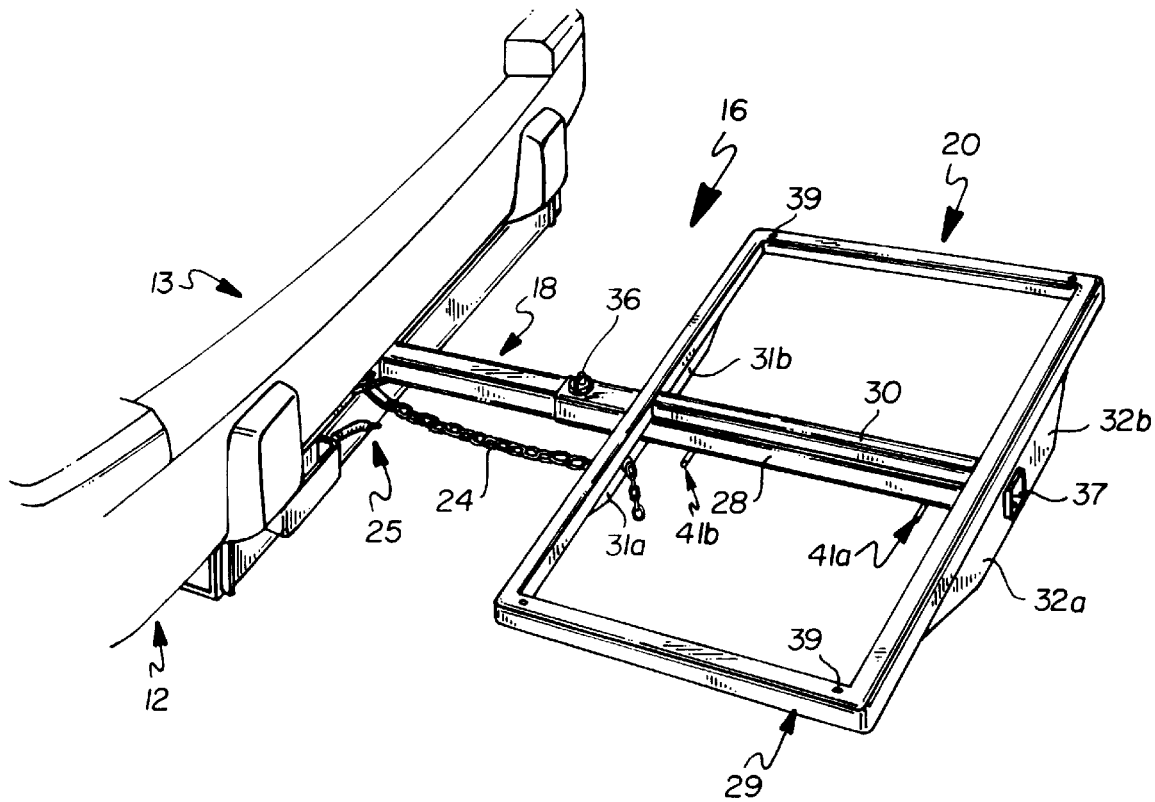
FIG. 3 is a perspective view of the frame assembly shown in an extended position.
Figure 4:
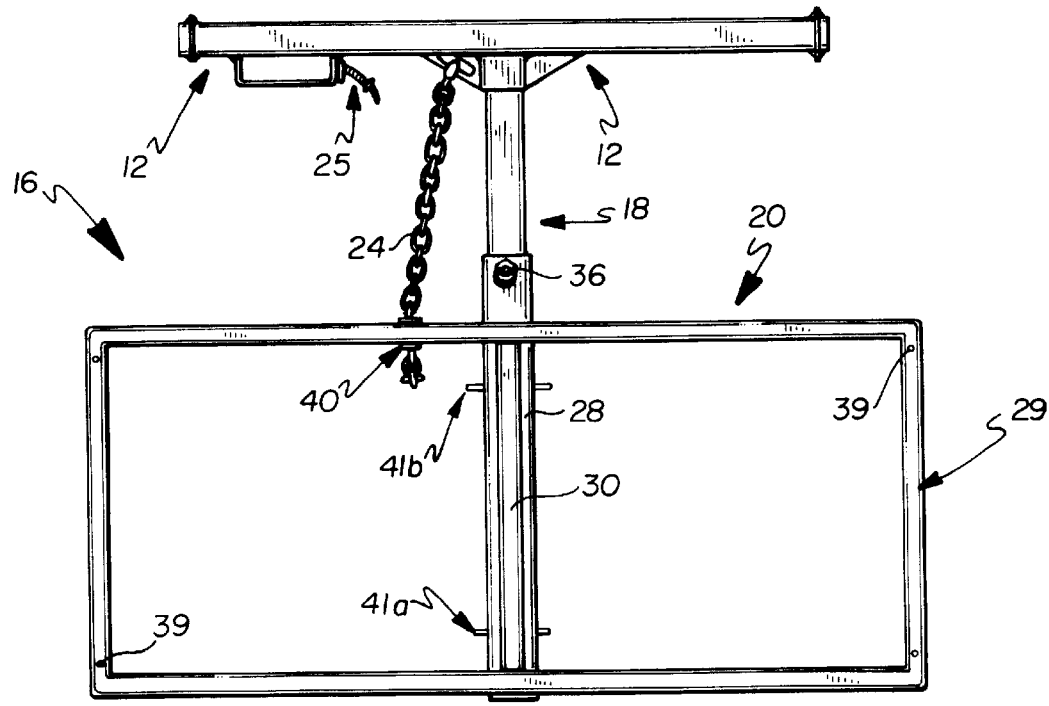
FIG. 4 is a top or plan view of the frame assembly, also shown in an extended position.
Figure 5:
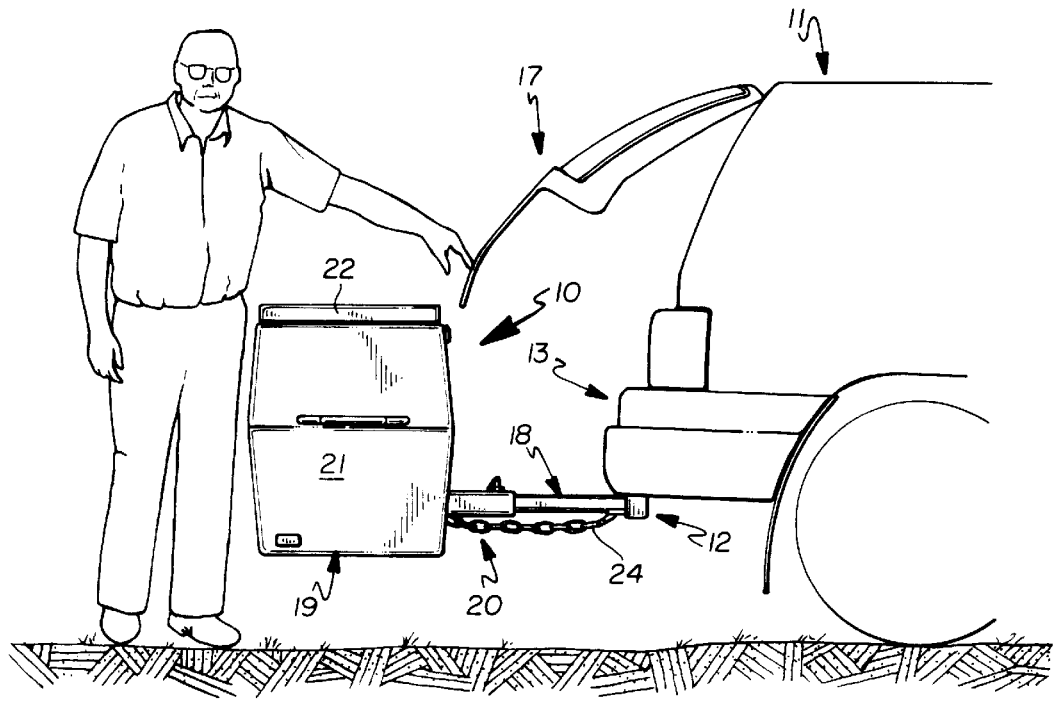
FIG. 5 is side view of the cargo carrier attached to a vehicle and shown in an extended position to allow unrestricted access to the rear hatch and interior cargo area of the vehicle.
Figure 6:
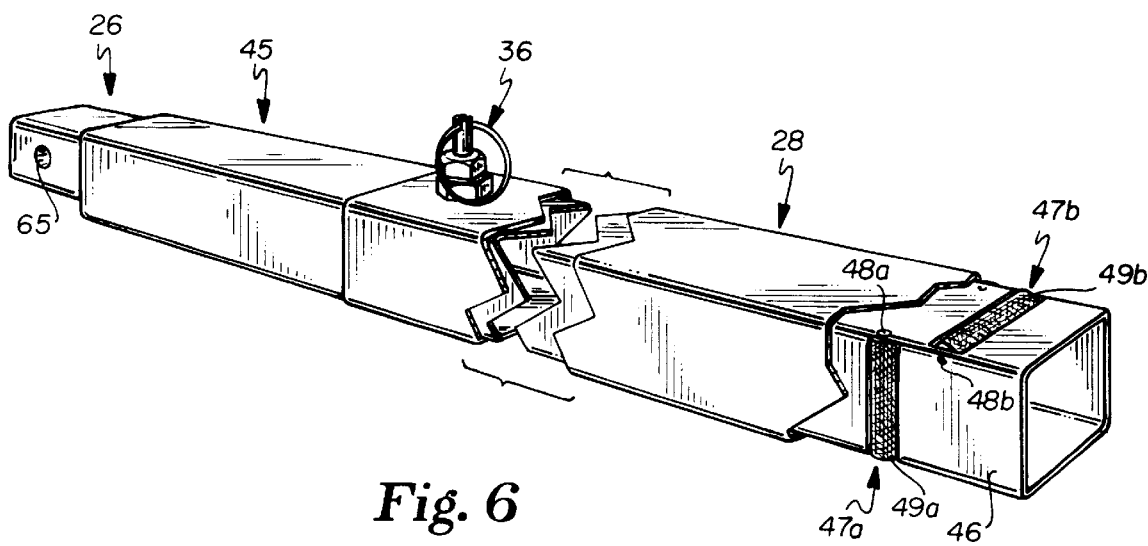
FIG. 6 is a perspective view of an embodiment of a connection member, partially in cross section and partially cut away, to show various internal features and components thereof.

Referring to FIGS. 3–5, the connection member 18 shown in this embodiment is inserted into the hitch 12 when in an operative orientation. The connection member 18 is a straight, somewhat elongated, bar shaped structure with a hollow interior and which has external dimensions such that it is mateable with the interior of the hitch 12 and with a predetermined portion of the frame member 20 as is described further below. The connection member 18 is preferably formed of hollow ³⁄₁₆th inch thick, 2 inch outside dimension (OD) square metal steel or aluminum stock. Referring also to FIG. 6, preferably for a 1¼ inch hitch, the proximal end 26 of the member 18 is solid and has a rectangular outside dimension of 1¼ inches. Alternatively, the entire length of the connection member may be 1¼ inch OD. For 2 inch hitches, the entire length of the connection member 18 is 2 inch OD. The connection member 18 has a preferred length of approximately 29 inches for a Jeep Grand Cherokee. This length has been found to provide optimal strength and stability characteristics as well as an optimal amount of extension of the box member 19 away from the rear of the vehicle 11 for purposes of opening the rear door or hatch 17, and providing access to the vehicle interior therethrough, as is best shown in FIG. 5. Preferably, the connection member 18 has a horizontally aligned aperture or apertures 65 disposed a predetermined short distance from its proximal or inwardly disposed end to permit locking of the connection member 18 proximal end in the hitch via pin, shaft or bolt through apertures 15 (See FIG. 7) of the hitch 12. Additionally, the connection member 18 has a vertically disposed connection aperture (not shown) disposed at a position whereby it is spaced a short distance from the distal end of the connection member 18.

Figure 19:
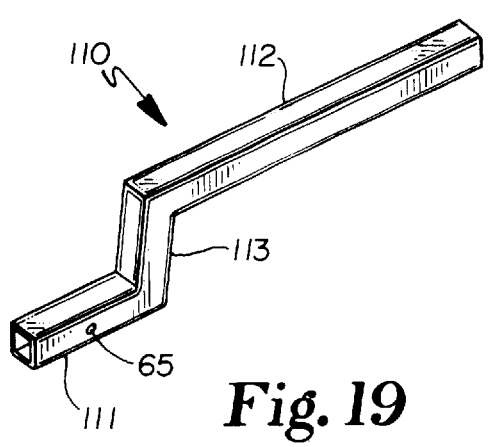
FIG. 19 is a side view of a raised connection member.
Figures 20, 21:
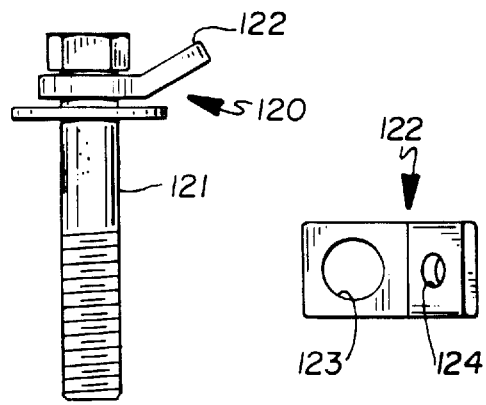
FIG. 20 is a side view of a safety pin assembly.
FIG. 21 is a top view of the angle plate shown in FIG. 20.

Alternatively, other embodiments of the invention replace a straight connection member 18 with a raised connection member 110 like the one illustrated in FIG. 19. The raised connection member 110 increases the carrier-to-ground clearance. Although the raised connection member 110 can be configured in many ways, FIG. 19 shows a lower proximal portion 111 connected to an upper distal portion 112 via a vertical portion 113. These portions may be welded or fastened together, or may be formed as a unitary structure. The lower proximal portion 111 has at least one aperture 65 to receive a pin and link with the hitch 12. FIGS. 7 and 27–30 illustrate a regular pivotal connection member. Pivotal movement of the distal member 57 permits an added range of movement. The operation of a pivotal connection member is described in greater detail below in the discussion related to FIGS. 27–30. FIG. 26 illustrates the proximal member of a raised pivotal connection member 140 that improves ground clearance on conversion vans requiring a pivoting frame. A pivot structure 136, including a pin 139 and an upper and lower plate 137 and 138, is attached to the upper distal portion 112. The pivot structure 136 forms a pivoting hitch link for a distal member (not shown), which is slidably attached to the frame member.

The frame member 20 basically comprises a receiving member 28, a peripheral support frame 29, a rear brace 32, and an optional front brace 31. The receiving member 28 is slidably connected to the connection member 18 as shown in FIGS. 3, 4 and 6. The peripheral support frame is fixed to the top of the receiving member 28 and supports the cargo box 19. A central support member may be connected to the top of the receiving member to help support the box; however, it is preferably not included in order to reduce overall cost. The front and rear braces 31 and 32 strengthen the support frame 29 and its connection to the receiving member 28.

The receiving member 28 may be slidably inserted over the connection member 18 when in an operative orientation. The receiving member 28 is a straight, some what elongated, bar shaped structure with a hollow interior and which has internal dimensions such that it is mateable with the exterior of the connection member 18. The receiving member 28 is preferably formed of ³⁄₁₆ inch thick, 2 inch ID metal steel or aluminum stock. 1¼ inch ID stock may be used where a 1¼ inch OD connection member is provided with the carrier 10. The receiving member 28 has a preferred length of approximately 21.5 inches, a length which has been found to provide optimal strength, stability, and box 19 extension characteristics, as well as a support for a preferred storage box size and capacity. The receiving member 28 has an optional spring biased safety pin assembly 36 disposed on its top surface a predetermined distance from its proximal end. The fail safe safety pin assembly 36 comes into mating connection with a connection aperture (not shown) at the distal end of the connection member 18 when fully extended and with another connection aperture (not shown) at the proximal end of the connection member when fully retracted. The safety pin assembly 36 is preferably located approximately 6.5" from the proximal end of the receiving member 28. Thus, the safety pin 36 is located inside of the box member 19 and is not accessible if the lid 22 is locked, therefore securing the carrier from theft and unwanted extension without using a padlock.

FIGS. 3–5 show the frame member 20 in an extended position for access to the vehicle 11 interior through the open door or hatch 17. FIGS. 1 and 2 show the frame member 20 in a retracted position and ready for travel. In this position, the carrier 10 is in an aerodynamically favorable position closely spaced with respect to the vehicle 11. Additionally, the carrier 10 does not obstruct the rear view of the vehicle operator during travel. Finally, in the retracted position, the carrier 10 is firmly held in position a predetermined position, approximately 0.25 inches, away from the vehicle bumper 13 so that the bumper 13 and the carrier 10 do not contact and cause abrasion of each other during travel. Preferably two securement screws 41*a* and *b* are disposed on the bottom of the receiving member 28. The first screw 41*a* is disposed approximately 3.5" from the distal end of the receiving member 28, and the second screw 41*b* is disposed approximately 3.5" from the proximal end of the receiving member 28. The securement screws 41*a* and *b* have a set screw design with a hand operable knob or T-Bar configuration. The screws 41*a* and *b* engage the interiorly disposed connection member 18 along a range of points to more firmly fix the position of the receiving member 28. The distal securement screw 41*a* secures the carrier 10 in a retracted position. When intended, the carrier 10 is easily and quickly extended by loosening the distal securement screw 41*a*. The proximate securement screw 41*b* secures the carrier 10 in an extended position.

Figure 22:
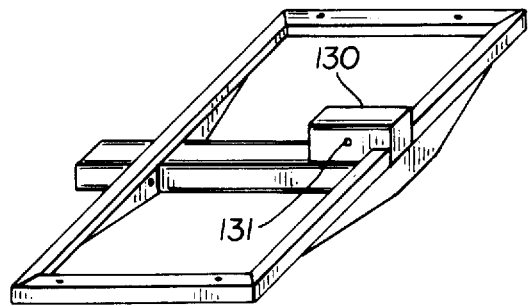
FIG. 22 is a perspective view of an embodiment showing an accessory tube welded onto the frame assembly.
Figure 23:
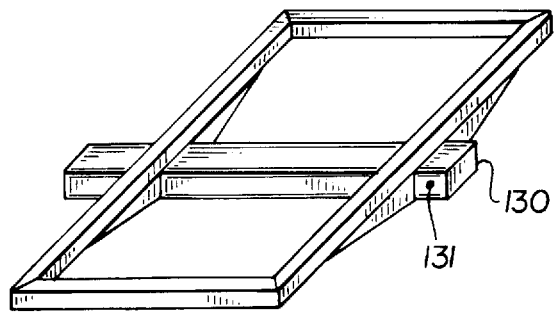
FIG. 23 is a perspective view of an embodiment showing an accessory tube bolted onto the frame assembly.
Figure 37:
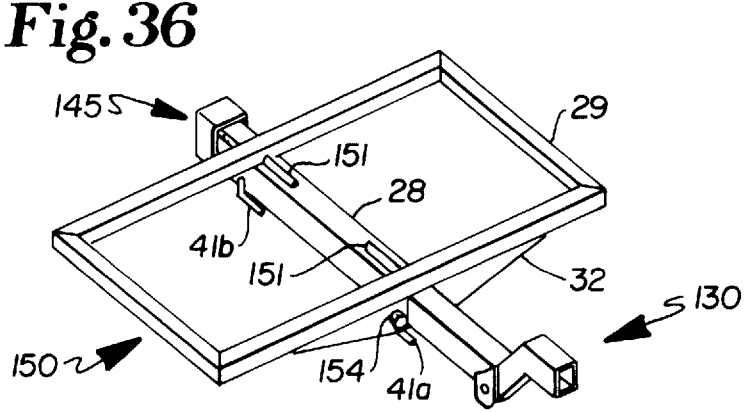
FIG. 37 is a perspective view of the tilting frame assembly of FIGS. 33–36.

Referring again to FIGS. 2–4, the peripheral support frame 29 is connected to the receiving member 28. The support frame 29 is a rectilinear structure and preferably rectangular, with a peripheral dimension sufficient to connect to and support the box member 19. An optimal dimension for the box 19 shown, has been found to be approximately 36 inches wide and 17 inches deep. The support frame 29 is preferably constructed of ⅛th inch thick, 1 inch OD, 15 gauge, square metal steel or aluminum stock. The frame 29 is preferably formed by welding straight pieces of stock together at their ends to form the corners of the rectangular frame 29. Apertures 39 are formed in the frame 29, approximately 2.5 inches from each corner in the short side members thereof. The apertures 39 are for connection of the box member 19 to the frame 29 via screws or bolts (not shown). An accessory tube 130 can be added to the movable frame 16 to support a bike rack, for example. The accessory tube can be welded on as in illustrated in FIG. 22, but it is preferably bolted on as illustrated in FIG. 23 and 37. The tube 130 has an aperture 131 for securing the frame of the bike rack or other accessory. Landing gear (not shown) can be added to the support frame 29 as an option in order to support a fully loaded carrier 10, allowing the vehicle to be driven away while the carrier 10 is left standing at a camp site or work site, for example. Additionally, the landing gear can assist with the hitching and unhitching process by raising and lowering the carrier.

The optional front brace 31 having segments 31*a* and 31*b* and rear brace 32 having segments 32*a* and 32*b* strengthen the frame 29 and its connection to the receiving member 28. The braces 31 and 32 are preferably constructed of ⅛th inch thick, flat metal steel or aluminum stock and are welded to the bottom of the frame 29. Each brace segment 31*a* and *b* and 32*a* and *b* is approximately 12 inches in length and has a rectilinear configuration.

Figure 24:
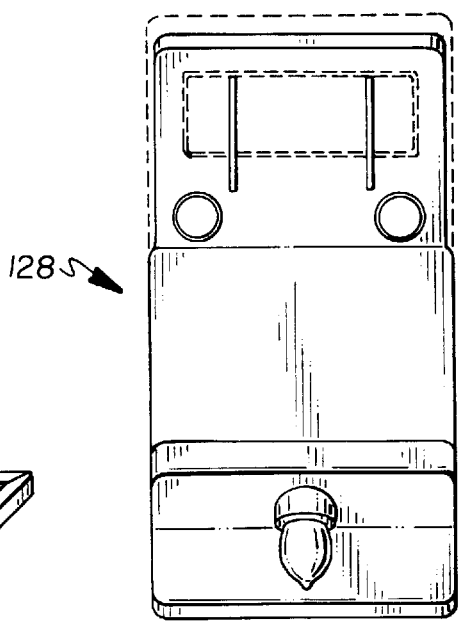
FIG. 24 is a planar view of battery powered lighting for a box member.
Figure 29:
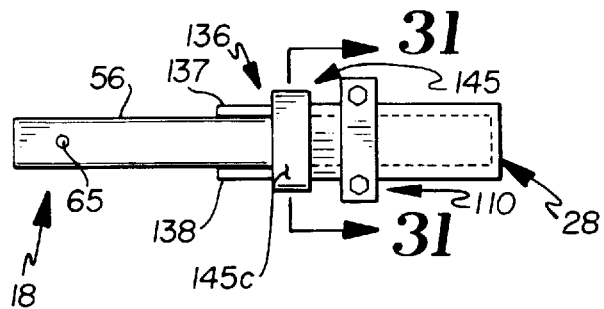
FIG. 29 is a detailed side view of the interface between the connection member and receiving member in a retracted position as shown in FIG. 27.
Figure 31:
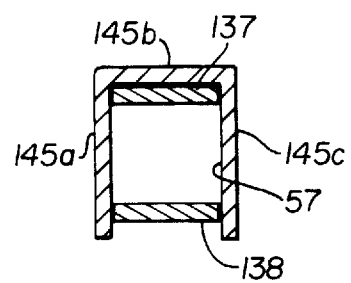
FIG. 31 is a cross section view taken along line 31—31 of FIG. 29.

Referring to FIGS. 1, 2 and 5, the box or container member 19 is for storage of articles such as luggage, gear, equipment or game. The box member 19 is shown to have an overall generally rectilinear configuration with curvilinear aspects or portions which enhance aerodynamic function. The box member 19 is disposed on top of the frame member 20, preferably as shown, and is attached thereto via connection screws or bolts cooperating with the connection apertures 39. The box member 19 has a body 21, preferably with a central recess area to which the frame 29 is attached, and has at least one top, rear or side opening lid 22 pivotally attached to the body 21. The lids 22 may include gas struts for opening and supporting the lids 22. Battery powered lights 128 (see FIG. 24) may be mounted on the inside of each lid. These lights are actuated when the lids are opened to make it easier to locate gear at night. The box member 19 configuration and/or its attachment to the frame 20 may be modified, consistent with the teachings of the invention, to change the clearance between the carrier 10 and the ground. These structures are preferably constructed of a plastic material such as polyethylene. This construction provides a light weight, weather-tight, corrosion resistant unit with an aerodynamic configuration. An exhaust shield 133 (see FIG. 25) may be mounted to the box member 19 to prevent hot exhaust fumes from melting the box member 19. The exhaust shield 133 is preferably made from galvanized steel and is fastened to the box member 19 through mounting apertures 134. The shield 133 is formed with raised dimples 135 that provide an insulating layer of air between the shield 133 and the box member 19. Handles on each side of the box member simplify the handling and mounting of the carrier and a handle on the back of the box member provides a grip to extend the movable frame 16. The box member 19 preferably has two 1.25" drain plugs located in its bottom in order to make cleaning easier. These drain plugs are sealed with blind grommets which can easily be removed if the carrier needs to be hosed out.

Referring to FIG. 6, an alternative embodiment of the connection member 45 provides improved carrier extension and retraction performance. The embodiment comprises a straight, elongated, bar shaped body 46 with a hollow interior and which has external dimensions substantially equivalent to that of the connection member 18 discussed above. The body 46 has a plurality of bearings 47 (only a and b shown), preferably three (3), disposed at its distal or outwardly extended end. The bearings 47 permit the receiving member 28 to be smoothly and slidingly moved over the connection member 45 during extension and retraction of the carrier 10. The bearings 47 are preferably cylindrical structures which are disposed in channels 49a, b, . . . n and are rotatable about pins or shafts 48a, b, . . . n mounted in the body 46. As shown, the bearings 47a, b, . . . n protrude a predetermined slight distance above the surface of the body 46 for rotatable contact with the sliding receiving member 28.

Referring to FIG. 7, an alternative embodiment of the connection member 55 provides an improved range of carrier movement, in an extended position, through a pivotal structure. This is particularly useful with vehicles having vertically hinged doors. The connection member 55 generally comprises a first or proximal member 56, a second or distal member 57 and a connector 58. The proximal member 56 has a predetermined length and is insertable in the interior channel or lumen 14 of the hitch 12. The proximal member 56 has a rectilinear slot 64 of a predetermined dimension at its distal end. The connector 58 has a flat configuration of a predetermined dimension with a rectilinear proximal portion 63 and a curvilinear distal end 59. The connector 58 is fixedly attached to the distal end of the proximal member 56 via the slot 64. The distal member 57 has a slot 62 of a predetermined dimension at its proximal end. The distal end of the connector 58 is mated to the slot 62 and pivotally held therein, in a horizontal plane, via a pin or shaft 60 which is vertically oriented and extends through aligned apertures 61 in the distal member 57 and through a corresponding aperture (not shown) in the connector 58. The aforementioned structure permits the distal member 57 to horizontally pivot and move laterally with respect to the proximal member 56, and thus the hitch 12 in which the proximal member 56 is inserted, when the receiving member 28 is extended and the structure is not encased by the member 28. Pivotal movement of the distal member 57 permits an added range of movement of the box member 19 away from the vehicle door or hatch 17.

Figure 30:
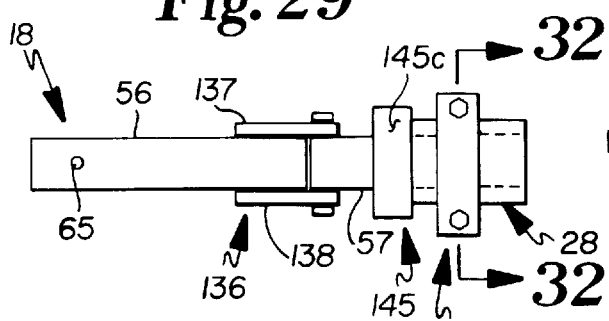
FIG. 30 is a detailed side view of the of FIG. 29 in a partially extended position.

Referring to FIGS. 27–31, the structure is stabilized and pivotal movement of the distal member 57 about pin 139 of the pivot structure 136 is restrained by a locking member 145 when the frame member 20 is retracted. Preferably, three locking plates 145a, b and c are attached to the proximal end of the receiving member 28. The side plates 145a and c prevent the pivotal movement of the distal member 57 and the top plate 145b strengthens the overall locking member assembly. In the retracted position shown in FIGS. 29 and 31 the locking member 145 encases the pivot structure 136, including the top and bottom plates 137 and 138, and prevent the pivotal movement of the distal member 57, the receiving member 28, and the rest of the frame member 20. However, the frame member 20 can pivot in an extended position when the locking member 145 does not encase the pivot structure 136 as shown in FIG. 30.

Referring to FIG. 8, an alternative embodiment of the carrier which permits an increased longitudinal movement distance for extension of the box member 19 is shown. The embodiment comprises a first or proximal connection member 71, a second or distal connection member 72, each of a predetermined length, and a modified receiving member 73. Each of these structures are preferably constructed of square metal stock with a hollow interior. The proximal connection member 71 has proximal and distal ends 76 and 77, respectively, and a predetermined outside dimension such that the proximal end 76 of the proximal connection member 71 is internally mateable within the hitch 12. A guide pin 78 of a predetermined cylindrical configuration is disposed on the bottom of the proximal connection member 71, centrally and a predetermined distance from the distal end 77 thereof. The distal connection member 72 has proximal and distal ends 79 and 80, respectively, and a hollow interior with a predetermined inside dimension such that the proximal end thereof is externally mateable over the distal end 77 of the proximal connection member 71. The distal connection member 72 has a generally centrally disposed, longitudinally oriented guide slot 81 on its bottom surface. The guide slot 81 has a predetermined lateral dimension and length, and cooperates with the guide pin 78 to control movement of the distal connection member 72 with respect to the proximal connection member 71. The distal connection member 72 further has a guide pin 82 of a predetermined cylindrical configuration disposed centrally on its bottom surface a predetermined distance from the distal end 80 thereof. The distal connection member 72 has a predetermined outside dimension such that the distal end 80 thereof is interiorly mateable within the proximal end of the receiving member 73. The receiving member 73 also has a generally centrally disposed, longitudinally oriented guide slot 83 on its bottom surface. The guide slot 83 has a predetermined lateral dimension and length, and cooperates with the guide pin 82 to control movement of the receiving member 73 with respect to the distal connection member 72. The aforementioned telescoping two-part connection member assembly provides an increased extensible travel distance.

Figure 13:
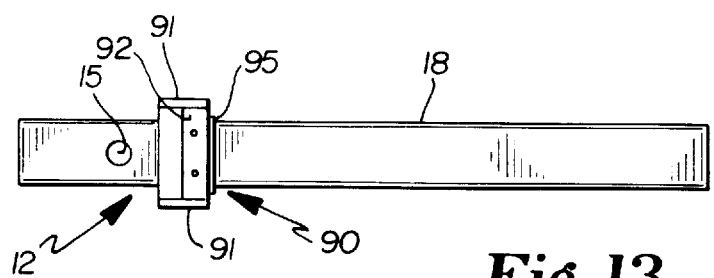
FIG. 13 is a side view of the clamp around the hitch and connection member.

Referring to FIGS. 9–12, a connection member clamp 90 for reducing lateral play in the connection member 18 is illustrated. As shown in FIG. 13, the clamp 90 secures the connection member 18 to the receiver-style hitch 12. The clamp 90 generally includes a connection member portion 92 and a hitch portion 91 designed to slide over the hitch 12.

Each side of the hitch portion 91 has a pair of fasteners 93, such as set screws or bolts, that are tightened to secure the clamp 90 to the hitch 12. The connection member receiving portion 92 has two pairs of fasteners 94 that are tightened to secure the clamp 90 to the connection member 18. A rubber bumper 95, such as a rubber O-ring, is slid over the distal end of the connection member 18 against the clamp 90 or vehicle hitch 12. The bumper 95 dampens the sound between the receiving member 28 and either the connection member 18 or the vehicle hitch 12 when the frame member 20 is retracted.

Referring to FIGS. 15, 20–21 and 27, a safety pin assembly 120 can be used as an alternative to the connection member clamp 90. The safety pin assembly 120 generally comprises a threaded pin or bolt 121 and may also include an angle plate 122 for attachment of a tether. The pin 121 is inserted through a pin aperture 123 in the angle plate 122 and the connection aperture 15 in the hitch 12. The pin 121 is screwed into a tapped aperture 65 in the connection member 18, and thus stabilizes the frame assembly 16 by preventing the connection member 18 from twisting or turning within the hitch 12.

The frame assembly 16 is preferably tethered to the hitch 12 using a chain, cable or other type of tether for safety reasons. FIGS. 3–5 show a safety chain 24 of a predetermined type and length being used to connect the frame of the carrier 10 to the vehicle hitch 12. Alternatively, at least one safety cable 115 and hook may be used to secure the movable frame assembly 16 to the hitch 12 (see FIG. 15). A second cable 116 can be attached to the safety pin assembly 120 through a cable aperture 124 in the angle plate 122 to create a fail safe hook up of the frame assembly 16 to the hitch 14.

Figure 16:
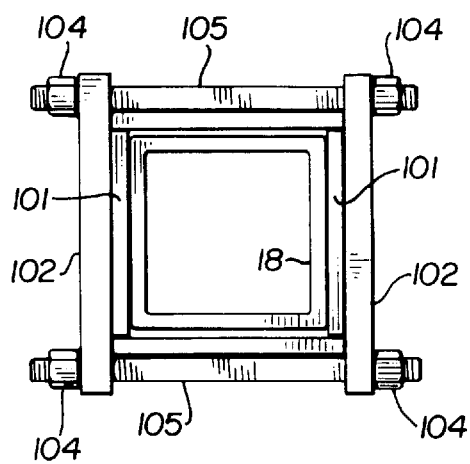
FIG. 16 is a front view of a sandwich assembly.
Figure 17:
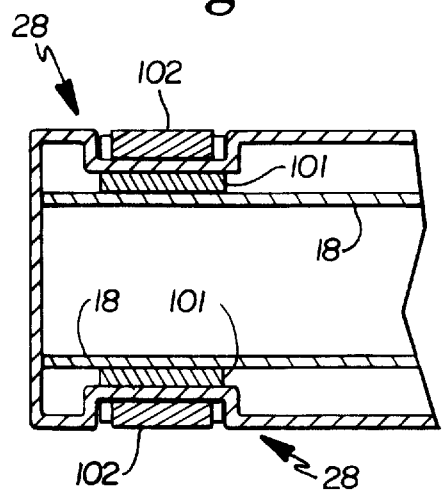
FIG. 17 is a partial top view of the sandwich assembly of FIG. 16.
Figure 18:
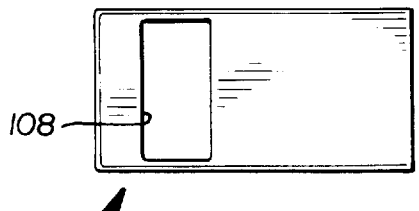
FIG. 18 is a side view a receiving member adapted to receive the sandwich assembly of FIG. 16.
Figure 12:
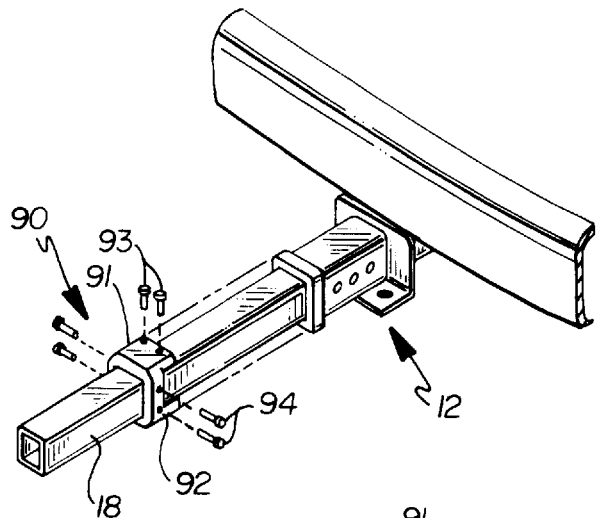
FIG. 12 is a perspective view of the clamp of FIG. 9 being installed on a vehicle.
Figure 32:
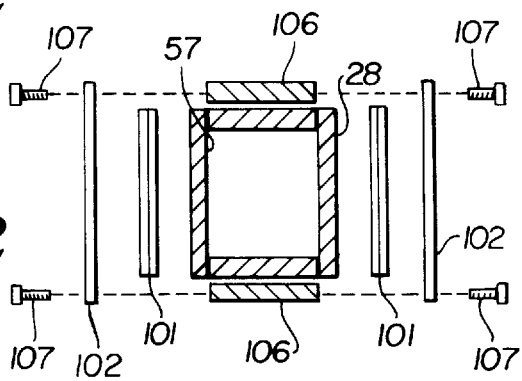
FIG. 32 is a cross-section view taken along line 32—32 of FIG. 29.
Figure 33:
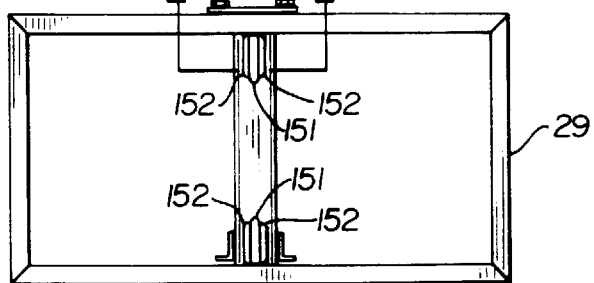
FIG. 33 is a top view of a tilting frame assembly.
Figure 34:
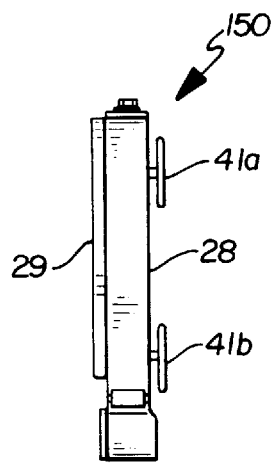
FIG. 34 is a side view of the tilting frame assembly of FIG. 33.
Figure 35:
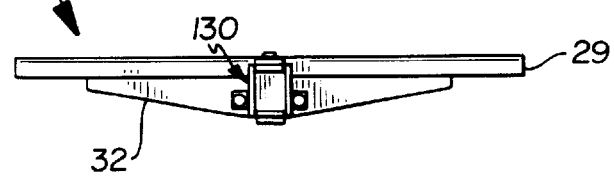
FIG. 35 is a front view of the tilting frame assembly of FIG. 33.
Figure 38:
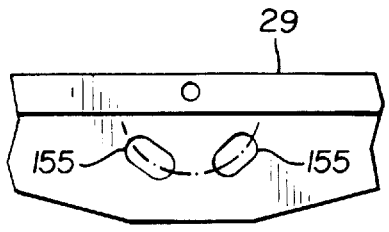
FIG. 38 is a view taken along line 38—38 of FIG. 36.
Figure 39:
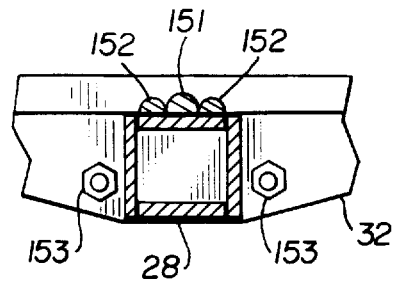
FIG. 39 is a cross-section view taken along line 39—39 of FIG. 33.
Figure 36:
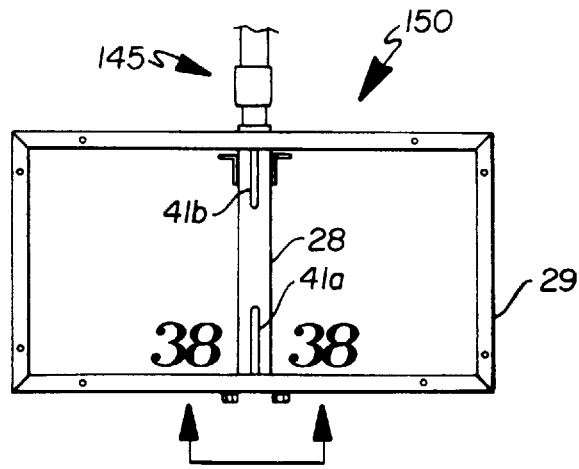
FIG. 36 is a bottom view of the tilting frame assembly of FIG. 33.

FIGS. 15–18, 27, 29–30 and 32 illustrate a sandwich assembly 100 designed to prevent binding between the receiving member 28 and the connection member 18, and to reduce lateral play in the cargo carrier 10 when the securement screws 41 are loosened. As shown in FIGS. 17 and 18, the receiving member 28 has two opposite slots 108 milled into its sides approximately 1" from the proximate end of the receiving member 28. Two steel plates 102 are located within these slots 108 and are tightened together using mounting nuts 104 and a threaded rod 105 as shown in FIG. 16, or alternatively by using hex spacers 106 and bolts 107 as shown in FIG. 32. Nylon shoes 101 are placed between each steel plate 102 and the outer surface of the connection member 18. These nylon shoes 101 are tightened with the plates 102 into operative contact with the slot 108 and serves as a bearing surface between the receiving member 28 and connection member 18. Thus the sandwich assembly 100 eliminates binding without using bearings 47 in the connection member 18.

A problem with carriers known in the art is that they can be misaligned or unleveled with respect to the vehicle because the hitch may not be mounted perfectly square with the body of the vehicle or because the tolerances in the hitch and frame assembly may build up to skew the mount of the carrier. FIGS. 33–39 illustrate a tilting frame assembly 150 that can be used to quickly and easily level a carrier. The tilting frame assembly 150 generally comprises a peripheral support frame 29 adjustably mounted onto a receiving member 28. The frame 20 has a pair of apertures in which a pair of clevis pins 151 are inserted. The frame 20 pivots on the pins 151 when the adjustment bolts 154 are loosened. Each pivot pin 151 is welded between a pair of steel blocks 152 that are welded on top of the receiving member 28. The tilting motion is limited by adjustment slots 155 found in the rear brace 32 of the frame 20. Adjustment nuts 153 are welded onto the sides of the receiving member 28 and flush with its distal end. The bolts 154 are screwed into these nuts 153 through the slots 155 and through washers (not shown). The bolts 154 tighten around the brace 32 to set the frame 29 at a desired level position. These bolts 154 may also be used to attach an accessory tube 130 as shown in FIG. 37. Securement screws 41a and b are tightened to firmly fix the position of the connection member 18 within the receiving member 28. The distal securement screw 41a secures the carrier 10 in a retracted position. The proximate securement screw 41b secures the carrier 10 in an extended position.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A movable frame assembly for attachment to the rear portion of a vehicle via a trailer hitch, comprising:
    (a) a connection member having a proximal portion of a predetermined configuration for mating with the trailer hitch, and further having a horizontally disposed distal portion; and
    (b) a frame member having a horizontally disposed receiving member slidably attached to said distal portion of said connection member, wherein said frame member has a horizontally inward retracted position and a horizontally outward extended position.

2. The movable frame assembly of claim 1, wherein said connection member has at least one hitch connection aperture disposed in said proximal portion for locking the connection member to the trailer hitch.

3. The movable frame assembly of claim 1, further comprising a connection clamp for securing said connection member to the hitch, said clamp including a connection member portion designed to fit around said proximal portion of said connection member, and further including a hitch portion designed to fit around the hitch, wherein a plurality of fasteners secure said clamp to the hitch and to said connection member, whereby said clamp reduces lateral play between said connection member and the hitch.

4. The movable frame assembly of claim 3, further including a rubber bumper, wherein said rubber bumper fits around said distal portion of said connection member and is positioned against said clamp.

5. The movable frame assembly of claim 1, further comprising a threaded safety pin, wherein said connection member has a threaded aperture aligned with a hitch aperture, wherein said pin is screwed through the hitch aperture into said threaded aperture to stabilize said connection member within the hitch.

6. The movable frame assembly of claim 1, wherein said connection member has at least one bearing for facilitating sliding movement of said frame member therewith.

7. The movable frame assembly of claim 1, further comprising a sandwich assembly, wherein said receiving member is telescopically connected to said connection member, wherein said receiving member has two opposite slots, wherein said sandwich assembly includes two plates, two nylon shoes and tightening means for securing said plates and shoes to said receiving member, wherein each of said slots contain one of said plates and one of said nylon shoes, wherein said plates are tightened together about said receiving member and said nylon shoes, and wherein said nylon shoes contact said connection member, whereby said nylon shoes form a bearing surface between said receiving member and said connection member.

8. The movable frame assembly of claim 1, wherein said connection member includes a lower proximal portion connected to an upper distal portion, wherein said lower proximal portion is mated with the trailer hitch and said upper distal portion is slidably attached to said frame member.

9. The movable frame assembly of claim 8, wherein said upper distal portion has a first bar portion of a predetermined length, a pivot structure fixed to a distal end of said first bar portion, and further has a second bar portion of a predetermined length, said second bar portion being horizontally pivotally attached to said pivot structure via a pivot shaft, whereby said second bar portion is horizontally pivotal with respect to said first bar portion.

10. The movable frame assembly of claim 1, wherein said connection member has a first bar portion of a predetermined length, a pivot structure fixed to a distal end of said first bar portion, and further has a second bar portion of a predetermined length, said second bar portion being horizontally pivotally attached to said pivot structure via a pivot shaft, whereby said second bar portion is horizontally pivotal with respect to said first bar portion.

11. The movable frame assembly of claim 10, wherein said receiving member is telescopically connected to said second bar portion, said receiving member having a proximal end and at least one locking member attached to said proximal end, wherein said at least one locking member prevents said second bar portion from pivoting about said pivot structure when said frame member is in the retracted position.

12. The movable frame assembly of claim 1, further comprising a second connection member slidably connected to said connection member, said second connection member having a hollow interior and being telescopically inserted over said connection member, wherein said connection member has an alignment pin, wherein said second connection member has an alignment pin and alignment slot which is cooperatively mated with said connection member alignment pin, and wherein said receiving member has an alignment slot which is cooperatively mated with said second connection member alignment pin.

13. The movable frame assembly of claim 1, wherein said receiving member is telescopically connected to said connection member, and further includes a box support member attached to said receiving member, said box support member having means for securing a box member to a top surface thereof, wherein said receiving member is a straight bar structure of a predetermined length, said receiving member having a proximal end for sliding insertion over said connection member, and further having an opposing distal end for attachment to said box support member, said bar structure having predetermined inside dimensions which are substantially equivalent to outside dimensions of said connection member.

14. The movable frame assembly of claim 13, wherein said receiving member has at least one securement screw to engage and secure said connection member within said receiving member.

15. The movable frame assembly of claim 13, wherein said receiving member has a spring biased locking pin disposed on a top surface a predetermined distance from its proximal end for mating connection with a frame connection aperture positioned on a top surface of said connection member, wherein said locking pin mates with said frame connection aperture when said frame member is in the extended position.

16. The movable frame assembly of claim 15, wherein a box member is mounted on said box support member and said locking pin is disposed on said top surface of said receiving member to be accessible only from within said box member.

17. The movable frame assembly of claim 1, wherein said frame member includes a landing gear assembly, wherein said landing gear assembly supports an unhitched frame assembly, wherein said landing gear assembly is retractable, and wherein said landing gear assembly vertically adjusts said frame assembly for hitching and unhitching said frame assembly from the vehicle.

18. The movable frame assembly of claim 1, further including a box member of a predetermined dimension mounted onto said frame member, said box member having a body and at least one top lid pivotally attached thereto.

19. The movable frame assembly of claim 18, wherein said body of said box member has a bottom, said bottom having at least one drain plug.

20. The movable frame assembly of claim 18, wherein said box member further includes at least one gas strut for opening and supporting said at least one lid.

21. The movable frame assembly of claim 18, wherein said box member has at least one light fixture mounted on a bottom surface of said at least one lid, wherein said at least one light fixture is actuated when said at least one lid is pivoted into an open position.

22. The movable frame assembly of claim 18, wherein said box member has a rear handle for extending the frame assembly.

23. The movable frame assembly of claim 18, further including an exhaust shield mounted to said box member, wherein said exhaust shield prevents hot gas from melting said box member.

24. The movable frame assembly of claim 1, wherein said frame member includes an accessory tube for mounting gear.

25. The movable frame assembly of claim 1, further comprising a tether connecting said frame member to the vehicle hitch.

26. The movable frame assembly of claim 1, wherein said frame member is a tilting frame member having a support frame, said receiving member is telescopically connected to said connection member, at least one pivot member disposed on said receiving member, and a level adjustment assembly on said frame member, wherein said support frame tilts on said at least one pivot member and said level adjustment assembly secures said support frame at a desired tilt position.

27. The movable frame assembly of claim 26, wherein said at least one pivot member includes a pair of blocks fixed to said receiving member and a clevis pin fixed between said blocks, wherein said clevis pin is pivotally attached to said support frame.

28. The movable frame assembly of claim 26, wherein said level adjustment assembly includes a pair of threaded nuts attached to said receiving member, a pair of threaded bolts for mating with said nuts, and a brace attached to said support frame, said brace having a pair of adjustment slots positioned approximate to said nuts, wherein each of said bolts is inserted through one of said slots into one of said nuts, and wherein said bolts secure said support frame at the desired tilt position by tightening said brace between said bolts and said nuts.

29. A movable frame assembly for attachment to the rear portion of a vehicle via a trailer hitch, comprising:
  (a) a connection member having a proximal portion of a predetermined configuration for mating with the trailer hitch, and further having a distal portion; and
  (b) a frame member slidably attached to said distal portion of said connection member, wherein said frame member includes:
    (1) a support frame having a brace;
    (2) a receiving member telescopically connected to said connection member;
    (3) a proximate and a distal pair of blocks, said proximate pair of blocks being mounted to a top surface of said receiving member adjacent to a proximate side of said support frame, and said distal pair of blocks being mounted to said top surface adjacent to a distal side of said support frame;
    (4) a proximate clevis pin and a distal clevis pin, said proximate pin being pivotally attached to said proximate side of said support frame and being fixed between said proximate pair of blocks, and said distal pin being pivotally attached to said distal side of said support frame and being fixed between said distal pair of blocks; and
    (5) at least one nut attached to said receiving member proximate to said brace, and at least one bolt for mating with said at least one nut, said brace having at least one slot sized, positioned and arranged to receive said at least one bolt and to permit a predetermined range of tilting motion in said support frame, wherein said at least one bolt is inserted through said at least one slot and screwed into said at least one nut.

30. A movable frame assembly for attachment to the rear portion of a vehicle via a trailer hitch, comprising:
  (a) a connection member, wherein said connection member has a first bar portion of a predetermined length and of a configuration for mating with the trailer hitch, a pivot structure fixed to a distal end of said first bar portion, and further has a second bar portion of a predetermined length, said second bar portion being horizontally pivotally attached to said pivot structure via a pivot shaft, whereby said second bar portion is horizontally pivotal with respect to said first bar portion;
  (b) a threaded safety pin, wherein said first bar portion has a threaded aperture aligned with a hitch aperture, wherein said pin is screwed through the hitch aperture into said threaded aperture to stabilize said connection member within the hitch; and
  (c) a frame member slidably attached to said second bar portion, wherein said frame member has a retracted position and an extended position, wherein said frame member includes:
    (1) a support frame having a brace;
    (2) a receiving member telescopically connected to said second bar portion, said receiving member having a proximal end and at least one locking member attached to said proximal end, wherein said at least one locking member prevents said second bar portion from pivoting about said pivot structure when said frame member is in the retracted position, said receiving member further having two opposite slots;
    (3) a sandwich assembly having two plates, two nylon shoes and tightening means for securing said plates and shoes to said receiving member, wherein each of said slots contain one of said plates and one of said nylon shoes, wherein said plates are tightened together about said receiving member and said nylon shoes, and wherein said nylon shoes contact said second bar portion, whereby said nylon shoes form a bearing surface between said receiving member and said second bar portion;
    (4) a proximate and a distal pair of blocks, said proximate pair of blocks being mounted to a top surface of said receiving member adjacent to a proximate side of said support frame, and said distal pair of blocks being mounted to said top surface adjacent to a distal side of said support frame;
    (5) a proximate clevis pin and a distal clevis pin, said proximate pin being pivotally attached to said proximate side of said support frame and being fixed between said proximate pair of blocks, and said distal pin being pivotally attached to said distal side of said support frame and being fixed between said distal pair of blocks; and
    (6) at least one nut attached to said receiving member proximate to said brace, and at least one bolt for mating with said at least one nut, said brace having at least one slot sized, positioned and arranged to receive said at least one bolt and to permit a predetermined range of tilting motion in said support frame, wherein said at least one bolt is inserted through said at least one slot and screwed into said at least one nut, and wherein said at least one bolt secures said support frame at a desired tilt position by tightening said brace between said at least one bolt and said at least one nut.

* * * * *